Oct. 6, 1953  M. MORGAN ET AL  2,654,642
BEARING
Filed Nov. 22, 1949  3 Sheets-Sheet 1

INVENTORS
MYLES MORGAN
JOSEPH M. O'MALLEY
BY Albert G. Blodgett
ATTORNEY

Oct. 6, 1953

M. MORGAN ET AL 2,654,642

BEARING

Filed Nov. 22, 1949

INVENTORS
MYLES MORGAN
JOSEPH M. O'MALLEY

BY Albert G. Blodgett
ATTORNEY

Patented Oct. 6, 1953

2,654,642

UNITED STATES PATENT OFFICE 2,654,642

BEARING

Myles Morgan and Joseph M. O'Malley, Worcester, Mass., assignors to Morgan Construction Company, Worcester, Mass., a corporation of Massachusetts Application November 22, 1949, Serial No. 128,734

4 Claims. (Cl. 308—59)

This invention relates to bearings, and more particularly to bearings for supporting the necks of the upper roll in a horizontal rolling mill as employed in the rolling of metal.

It has been proposed heretofore to construct such a bearing with a segmental liner of phenolic resin or similar non-metallic material which engages the upper surface of the roll neck and thus receives the upward radial load due to the rolling operation. It has also been proposed to provide a shoe lined with phenolic resin and urged upwardly against the lower surface of the roll neck by means of springs to support the weight of the roll when no stock is traveling through the mill. The prior bearings of this nature have been complicated and expensive to manufacture, and they have required frequent adjustment because of wear of the phenolic resin liners.

It is accordingly one object of the invention to provide an improved roll neck bearing for upper rolls, which will be simpler and less expensive to manufacture than prior bearings.

It is a further object of the invention to provide a roll neck bearing for upper rolls which will require no adjustment because of wear of the liners.

With these and other objects in view, as will be apparent to those skilled in the art, the invention resides in the combination of parts set forth in the specification and covered by the claims appended hereto.

Referring to the drawings illustrating one embodiment of the invention and in which like reference numerals indicate like parts, Fig. 1 is a transverse section through an upper roll neck bearing and an associated roll, the section being taken on the line 1—1 of Fig. 6;

Figure 1:
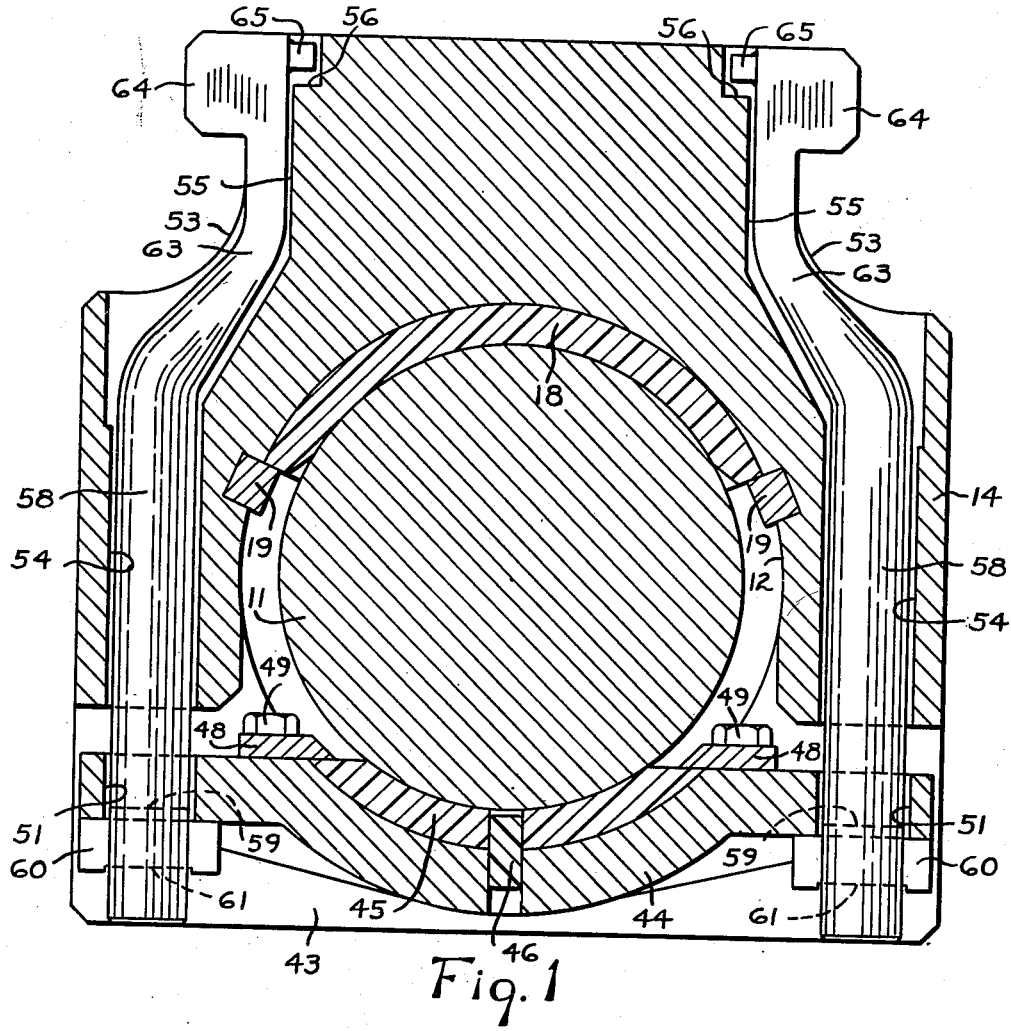
Figure 2:
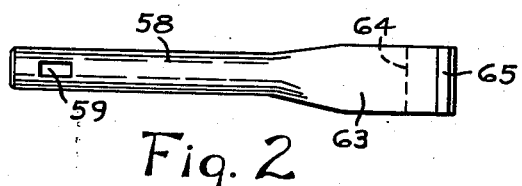
Fig. 2 is a detail view of a rod forming a part of the bearing.
Figure 3:
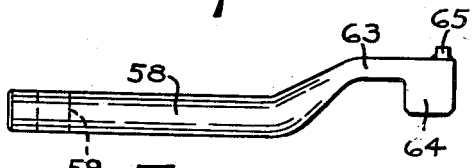
Fig. 3 is a further view of the rod shown in Fig. 2.
Figure 4:
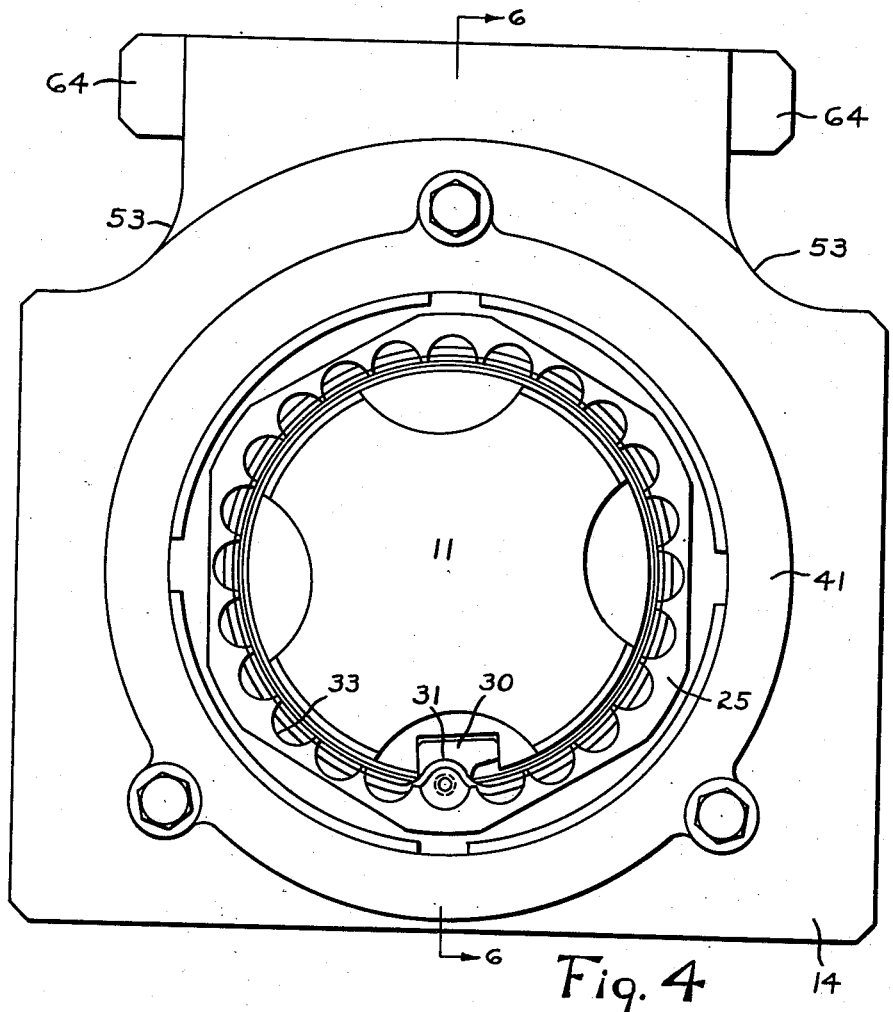
Fig. 4 is an end elevation of the bearing and roll.

The embodiment illustrated comprises a rolling mill roll 10 having a cylindrical roll neck 11. The particular roll shown is the upper roll of a 2-high horizontal mill. The roll neck 11 extends through a bore 12 in a bearing chock or casing 14 which is adapted to be mounted in the window 15 (Fig. 5) of a roll housing 16. Within the upper portion of the bore 12 there is mounted an arcuate liner 18 of phenolic resin or other suitable non-metallic material which engages the top of the roll neck 11 to receive the heavy upwardly directed radial load resulting from the rolling operation. As shown in Fig. 1, this liner 18 is held in place by means of two metal bars 19 engaging its opposite edges and suitably secured to the chock.

Figure 6:
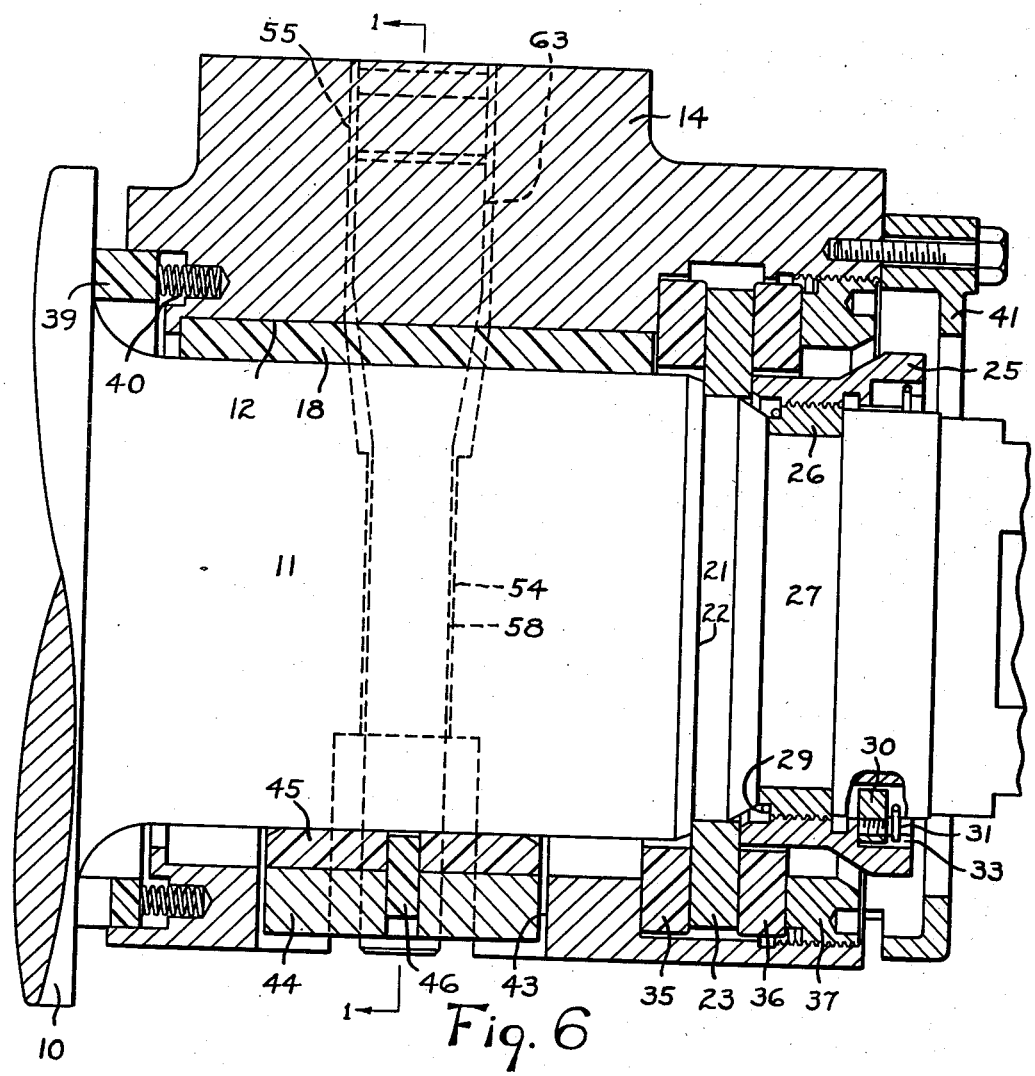
Fig. 6 is a section taken substantially on the line 6—6 of Fig. 4.
Figure 7:
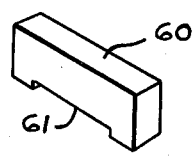
Fig. 7 is a perspective view of a key forming a part of the bearing.

Referring now to Fig. 6, it will be seen that the roll neck 11 is formed with a portion 21 which is reduced slightly in diameter to provide a shoulder 22. A metal ring 23 is suitably keyed to the portion 21 and held firmly against the shoulder 22 by means of a nut 25 which surrounds a threaded ring 26 mounted in a groove 27 in the roll neck and keyed thereto. For assembly purposes this threaded ring is divided along an axial plane into two pieces which are retained in the groove 27 by means of a garter spring 29. In order to prevent the nut 25 from loosening in service it is secured to the roll neck by a key 30 which is held in place by a wire snap ring 31. This key is arranged to engage any one of a series of notches 33 formed in the nut 25. The metal ring 23 is provided on its opposite sides with plane surfaces forming shoulders for sliding engagement with an inner thrust ring 35 and an outer thrust ring 36 suitably mounted within the chock 14. These thrust rings are formed of phenolic resin or other suitable non-metallic material. The outer thrust ring 36 is held in place by an adjusting ring 37 having external screw threads for engagement with internal screw threads in the chock. For a further description of this construction and of the means for keying the thrust rings against rotation, reference may be had to the prior patent to Rich et al. No. 2,367,613 granted January 16, 1945. In order to exclude scale and other foreign matter from the bearing, a ring 39 of phenolic resin or the like is mounted on the inner end of the chock 14 and urged against the adjacent end of the roll 11 by springs 40. An annular splash guard 41 is mounted on the outer end of the chock and surrounds the outer portion of the nut 25.

Means is provided to hold the roll neck 11 upwardly against the concave surface of the liner 18 and to support the weight of the roll 10 as well as that of the chock 14, so that there will be no jumping of the roll as the stock enters or leaves the roll pass. For this purpose a transverse recess 43 is provided in the lower portion of the chock 14, this recess intersecting the lower part of the bore 12. Within the recess 43 there is mounted a horizontal metal plate 44 which carries on its upper surface an arcuate liner 45 of phenolic resin or the like in contact with the lower surface of the roll neck 11. The liner 45 is secured to the metal plate 44 by a centrally located vertical phenolic resin dowel pin 46 and by metal clips 48 engaging the ends of the liner 45 and fastened to the plate 44 by screws 49 (Fig. 1). Vertical holes 51 are formed in the two end portions of the plate 44.

The upper corners of the chock 14, on opposite sides of the bore 12, are cut away to provide notches 53, and from each of these notches a substantially vertical opening 54 extends downwardly through the chock and into the recess 43. These openings 54 are preferably circular in cross-section, and they are aligned with the respective holes 51 in the plate 44. The upper end of each opening 54 is enlarged and communicates with a groove or recess 55 which extends to the top of the chock and opens outwardly into the adjacent notch 53. A small notch 56 is provided at the top of the inner wall of each recess 55. The recesses 55 are offset from the openings 54 inwardly, i. e. toward the vertical axial plane of the bearing, and as shown in Fig. 6 the width of the recesses somewhat exceeds the diameter of the openings 54.

An upright rod 58 is mounted in each opening 54 and extends downwardly through the hole 51 therebeneath. An opening 59 of rectangular cross-section extends horizontally through the lower portion of each rod, and a rectangular key 60 with a shallow notch 61 in its lower surface is mounted in each opening 59. The plate 44 rests on the keys 60. The upper portion 63 of each rod 58 is somewhat flattened and offset inwardly from the lower portion so that it lies within the adjacent recess 55. On the upper end of each portion 63 there is formed an outwardly projecting lug 64. A small horizontal bar 65 is welded or otherwise secured to the inner surface of each portion 63, near the top thereof, to provide an inwardly extending protuberance which lies within the adjacent notch 56 in the chock to prevent appreciable downward movement of the rod.

Figure 5:
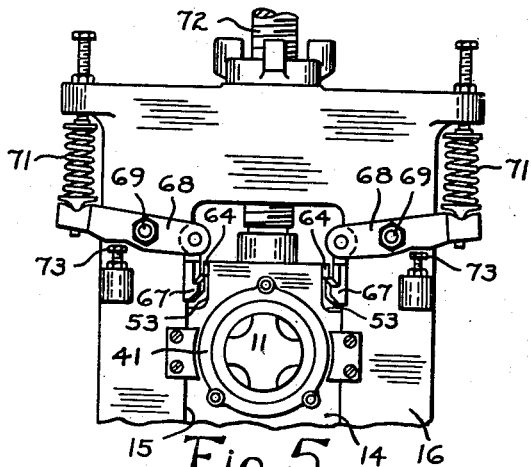
Fig. 5 is an end elevation of the upper portion of a rolling mill, with a bearing and roll in place therein.

Referring now to Fig. 5, it will be seen that when the chock 14 is in place in the housing window 15, the lugs 64 will rest on a pair of horizontal rails 67 of well-known construction which extend through the notches 53. These rails are supported by levers 68 each of which is mounted on a fulcrum pin 69 carried by the housing 16. The outer ends of the levers are urged downwardly by coiled compression springs 71. Upward movement of the chock 14 is resisted by the usual screw-down 72. Stop screws 73 are provided to limit movement of the levers 68 under the influence of the springs 71 when the roll and its bearings are removed from the housing.

It will now be apparent that in the operation of the invention the rails 67 will be urged upwardly by the springs 71 and the levers 68, and the rails will pull the rods 58 upwardly by engaging the lugs 64 thereon. The rods will raise the plate 44 and the liner 45, thus holding the roll neck 11 upwardly against the liner 18, and raising the chock 14 as far as the screw-down 72 will permit. Thus the entire weight of the upper roll 10 and its bearings will be carried by the rails 67 through the medium of the rods 58, and the roll will be held upwardly in the proper position at all times whether or not a bar is passing through the mill. Furthermore, any wear on the liners 18 or 45 will be taken up automatically as fast as it occurs. It will be understood that suitable means will be provided to supply water to the bearings for lubrication and cooling thereof in known manner.

When the roll and bearings are removed from the roll housing, the bearings will remain properly assembled. Until the keys 60 are removed from the rods 58, it will not be possible to withdraw the rods from the openings 54 in the chock. The bearings are relatively simple, compact, and inexpensive to manufacture.

Having thus described our invention, what we claim as new and desire to secure by Letters Patent is:

1. A bearing for a roll neck of a rolling mill comprising a chock having a horizontal bore to receive the roll neck and a transverse recess intersecting the lower portion of the bore, a liner mounted in the upper portion of the bore providing a concave lower surface for contact with the upper surface of the roll neck and adapted to receive the rolling pressure, the chock having two substantially vertical openings extending therethrough at opposite sides of the bore and communicating at their lower ends with the recess, a plate located in the recess and having end portions which extend beneath the openings in the chock, a liner mounted on the plate providing a concave upper surface for contact with the lower surface of the roll neck, a tension rod extending through each of the said vertical openings in the chock, means fastening the lower end portions of the rods to the adjacent end portions of the plate, the rods having portions extending upwardly beyond the upper ends of the said vertical openings and offset from said openings in directions inwardly toward the vertical axial plane of the bearing, and outwardly extending lugs on the offset portions of the rods adapted to engage supporting means independent of the bearing so that the rods may support the plate, the roll, and the chock.

2. A bearing as claimed in claim 1, in which the upper corners of the chock, on opposite sides of the bore, are cut away to provide notches from which the vertical openings extend downwardly and the upper end of each vertical opening communicates with a groove which extends to the top of the chock and opens outwardly into the adjacent notch, the offset upper portions of the rods being located within the grooves.

3. A bearing as claimed in claim 2, in which a small notch is provided at the top of the inner wall of each groove, and in which the upper portion of each rod is provided with an inwardly extending protuberance which lies within the adjacent small notch and limits downward movement of the rod.

4. An upper roll neck bearing for use in rolling mill having a window for receiving the bearing and having bearing supporting members extending inwardly of the window from the upper side portions thereof, said bearing comprising: a chock fitting said window for vertical sliding movement therein, the said chock having notches extending inwardly of the upper side portions thereof into which the supporting members normally extend, a bore in the chock in which the roll neck normally resides, a liner fixed to the upper surface of the bore, a horizontal recess extending through the chock transversely of and intersecting the bore, a plate residing in the recess and normally underlying the roll neck, a liner interposed between the plate and the roll neck, vertical passages extending from the notches of the chock into the horizontal recess, grooves in the chock intersecting the vertical passages and opening into the said notches, a rod residing in each vertical passage and connected at its lower end to an extremity of the plate, the upper end of the rod residing in one of said grooves and having a laterally-extending lug for engagement by one of said supporting members.

MYLES MORGAN.
JOSEPH M. O'MALLEY.

References Cited in the file of this patent

UNITED STATES PATENTS

| Number | Name | Date |
| --- | --- | --- |
| 1,956,933 | Smitmans | May 1, 1934 |
| 1,986,027 | Talbot | Jan. 1, 1935 |
| 2,367,613 | Rich | Jan. 16, 1945 |

FOREIGN PATENTS

| Number | Country | Date |
| --- | --- | --- |
| 560,273 | Great Britain | Mar. 28, 1944 |